Dec. 12, 1961 — A. E. BENSON ET AL — 3,012,599
SLOTTED TIRE TREAD
Filed June 20, 1958 — 3 Sheets-Sheet 1
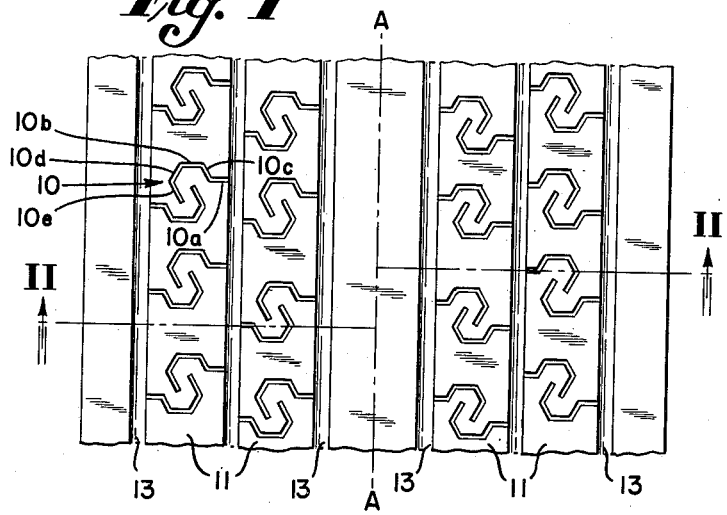
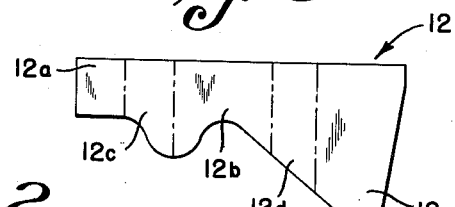
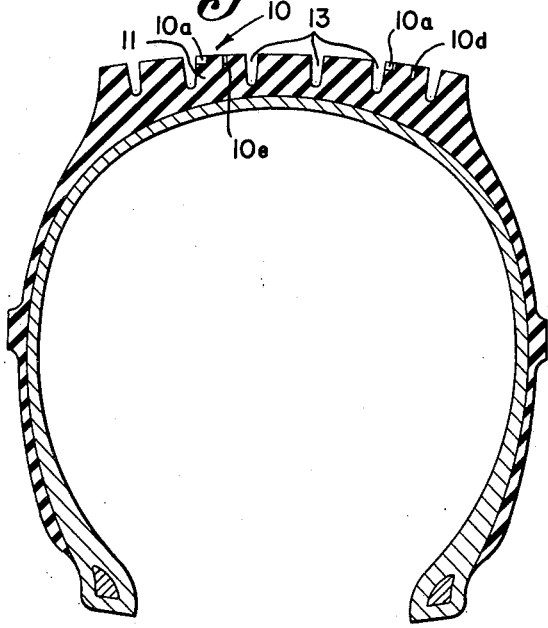
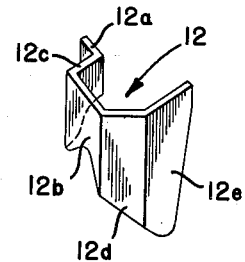
INVENTORS
ARTHUR E. BENSON
JAMES M. LANE
BY Irwin M. Lewis
ATTORNEY.

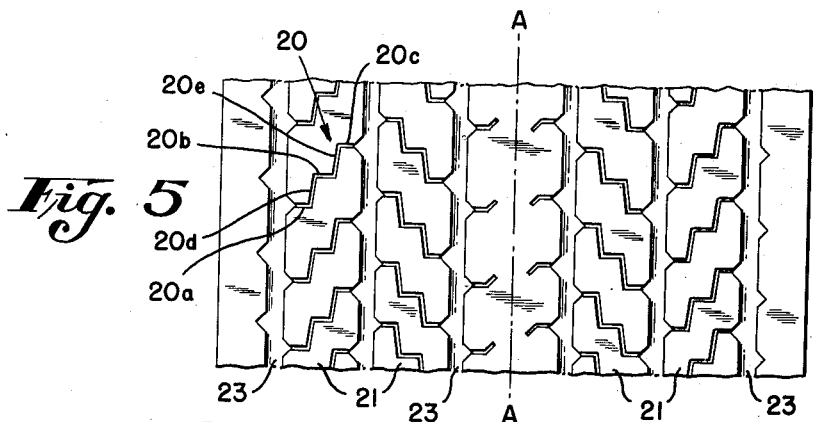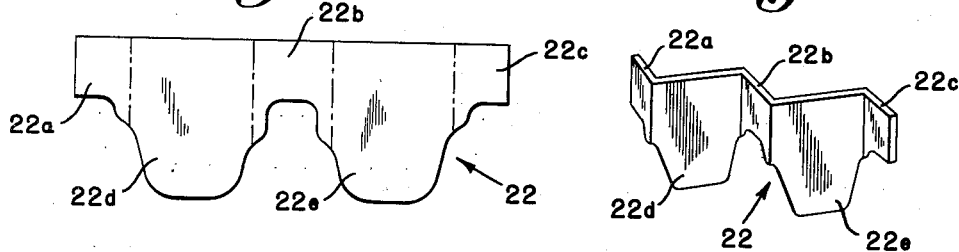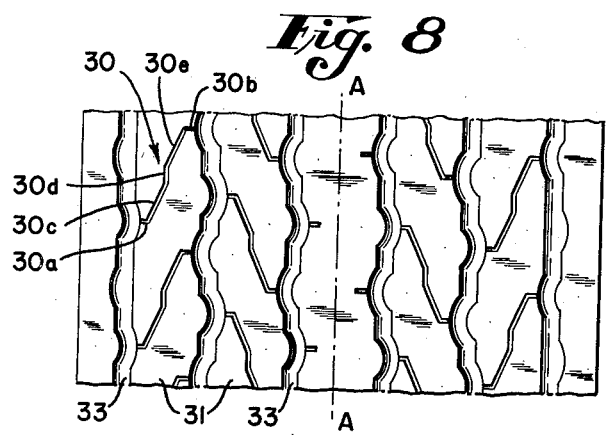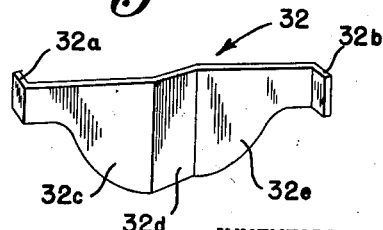
INVENTORS
ARTHUR E. BENSON
JAMES M. LANE
BY Irwin M. Lewis
ATTORNEY.

INVENTORS
ARTHUR E. BENSON
JAMES M. LANE
BY  *Irwin M. Lewis*
ATTORNEY.

United States Patent Office 3,012,599
Patented Dec. 12, 1961

3,012,599
SLOTTED TIRE TREAD
Arthur E. Benson, Larchmont, N.Y., and James M. Lane, St. Clair Shores, Mich., assignors to United States Rubber Company, New York, N.Y., a corporation of New Jersey
Filed June 20, 1958, Ser. No. 743,346
6 Claims. (Cl. 152—209)

This invention relates to tires incorporating circumferentially ribbed treads and in particular to the provision of slots in the tread ribs to increase the traction and skid resistance thereof.

This application is a continuation-in-part of our co-pending application Serial No. 518,096, filed June 27, 1955, now abandoned.

The provision of slots in the tread ribs of tires is broadly not new and many arrangements thereof have heretofore been proposed. While such arrangements have provided some increased traction, they have also presented certain disadvantages. Among such disadvantages are increased tread wear, increased tread noise, and the tearing out of sections of the tread between the slots as a result of operation at high road speeds.

A slot in a tire tread perpendicular to the direction of rotation causes the tread material to be subject to centrifugal and tractive forces which are of a damaging nature at high speeds. Slots parallel to the direction of rotation are not influenced by these forces to the same degree. Thus, these forces, especially centrifugal force, have a tendency to tear out lateral tread units, thus causing early destruction of the tire.

The object of the present invention is, therefore, to provide a novel tread slot arrangement for ribbed treads which will provide increased traction and skid resistance without loss of tread life, and, specifically, which will minimize the danger of loss of sections of the tread between the slots.

In accordance with the invention, the circumferentially extending ribs of a tire tread are provided with a plurality of slots formed in the tread surface. Each of these circumferentially-unconnected slots is itself formed of interconnecting generally transversely extending portions and generally circumferentially extending portions, the generally circumferentially extending portions having a mean depth greater than that of the generally transversely extending portions. The generally transversely extending portions of each slot collectively have a mean depth of not greater than 35% of the height of the tread rib, and the generally circumferentially extending portions collectively have a mean depth of not less than 50% of the height of the tread rib.

We have found that limiting the collective or mean depth of the generally transversely extending portions of the slot to 35% of the rib height minimizes the loss of sections of the tread between the slots. On the other hand, we have found that the generally circumferentially extending portions of the slots may be much deeper, i.e., 50% or more of the rib height. If proportioned to have collectively a mean depth of not less than 50% of the rib height, a very substantial increase in tread flexibility and traction properties will result.

Other objects and advantages of the present invention will become apparent from the following description when read in conjunction with the accompanying drawings, wherein:

FIG. 1 is a plan view of a section of a tire incorporating a slot arrangement in accordance with the present invention;

FIG. 2 is a cross-sectional view taken on the line II—II of FIG. 1;

FIG. 3 is a development of the mold insert used to form the slots in the tire of FIG. 1, showing by dash lines the bend lines thereof;

FIG. 4 is a perspective view of the insert shown in FIG. 3 after bending;

FIG. 5 is a plan view of a section of a tire incorporating another slot arrangement in accordance with the present invention;

FIG. 6 is a development of the mold insert used to form the slots in the tire of FIG. 5, showing by dash lines the bend lines thereof;

FIG. 7 is a perspective view of the insert shown in FIG. 6 after bending;

FIG. 8 is a plan view of a section of a tire incorporating still another slot arrangement in accordance with the present invention;

FIG. 9 is a development of the mold insert used to form the slots in the tire of FIG. 8, showing by dash lines the bend lines thereof;

FIG. 10 is a perspective view of the insert shown in FIG. 9 after bending;

Figure 11:
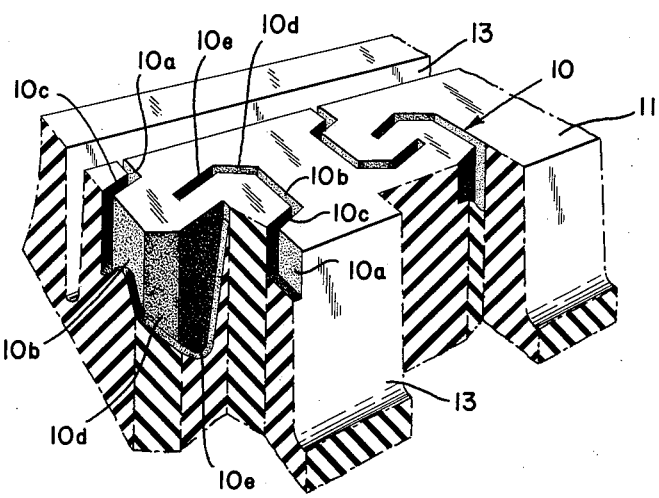
FIG. 11 is an enlarged perspective sectional view, with parts broken away, of the tread of the tire of FIG. 1, illustrating the variations in depth of the various portions of the tread slots.
Figure 12:
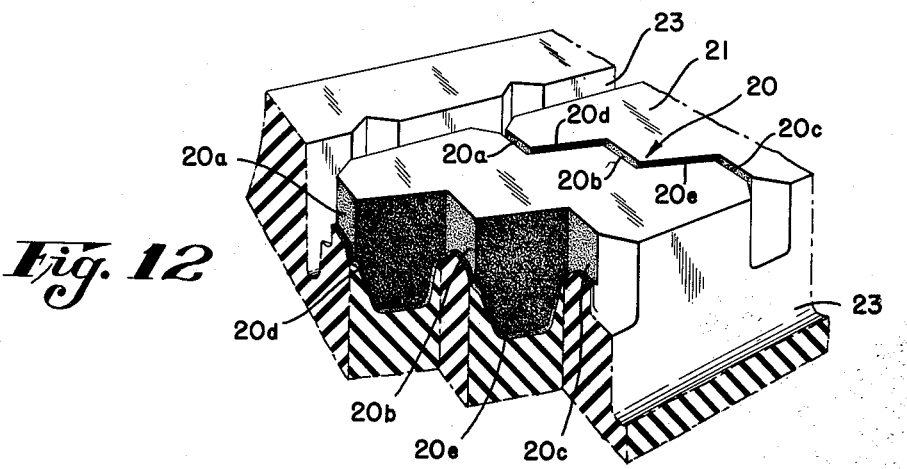
FIG. 12 is an enlarged perspective sectional view, with parts broken away, of the tread of the tire of FIG. 5, illustrating the variations in depth of the various portions of the tread slots.
Figure 13:
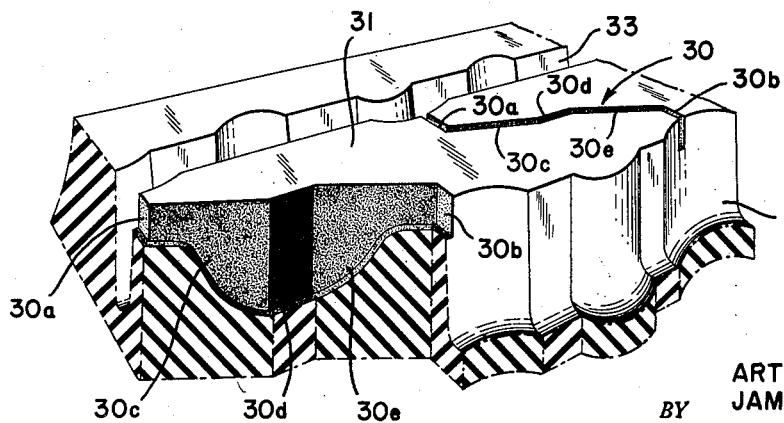
FIG. 13 is an enlarged perspective sectional view, with parts broken away, of the tread of the tire of FIG. 8, illustrating the variations in depth of the various portions of the tread slots.

The drawings show, by way of illustration, three embodiments of the subject invention. FIGS. 1, 2, 3, 4 and 11 refer to one such embodiment; FIGS. 5, 6, 7 and 12 refer to another such embodiment; and FIGS. 8, 9, 10 and 13 refer to still another embodiment of the invention.

Referring to FIGS. 1, 2, 3, 4 and 11, there is shown one embodiment of the invention in which circumferentially spaced pairs of slots 10 are formed in the surface of circumferentially extending rubber tread ribs 11 of a pneumatic tire. The slots 10 in this example are generally hook-shaped and one slot of each pair extends in from one edge of the rib 11 and the other extends in from the other edge of the rib 11. In this example, the slots 10 of each pair overlap one another both circumferentially and transversely of the tread.

Each of the hook-shaped slots in this embodiment of the invention is formed of interconnecting generally transversely extending portions 10a and 10b, and generally circumferentially extending portions 10c, 10d and 10e. In this example, the generally circumferentially extending portions 10c, 10d and 10e together form from 50% to 70% of the length of each slot 10. The slots 10 are formed in the ribs 11 during the molding of the tire, as is well known in tire building art.

FIG. 3 shows a development of one of the mold inserts 12 which form the slots 10 during the molding operation. The dash lines in FIG. 3 indicate the lines on which the insert is bent to form the insert shown in FIG. 4 which is used in the molding of the slots 10. It will be appreciated that a plurality of inserts 12 as shown in FIG. 4 are secured to the tread-forming wall of the tire mold to form all of the slots 10 simultaneously. The portions 12a and 12b of the insert 12 form the transversely extending portions 10a and 10b of the slot 10; portions 12c, 12d and 12e form the circumferentially extending portions 10c, 10d and 10e of the slots 10.

The term "generally transversely extending" as applied to portions of the slots means that such portions extend at an angle of greater than 45° to the circumferentially extending center line A—A of the tire (FIG. 1). The term "generally circumferentially extending" means that such portions extend at an angle of less than 45° to the circumferential center line A—A of the tire.

In accordance with the invention, the generally transversely extending portions of the slots in this example have a collective or mean depth of not greater than 35% of the height of the rib 11 as measured from the base of the anti-skid groove 13 to the outer surface of the rib 11, and the generally circumferentially extending portions of the slots have a collective or mean depth of not less than 50% of the height of the rib 11 in which they are formed.

In this embodiment, the transversely extending portion 10a of the slot 10 (FIG. 11), which extends inwardly from the edge of rib 11 and is formed by portions 12a of the insert 12, is of substantially uniform depth. Portion 10c, which extends generally in a circumferential direction and is formed by portion 12c of the mold insert 12, gradually increases in depth in the direction away from the portion 10a and has a mean depth greater than that of portion 10a. Transversely extending portion 10b of the slot 10, which is formed by portion 12b of the mold insert 12, decreases in depth from each end thereof towards the middle. The portions 10a and 10b have a mean depth not greater than 35% of the height of the rib 11 in which the slot is formed. Portions 10d and 10e, which extend in substantially circumferential directions and are formed by portions 12d and 12e of the insert 12, increase in depth in a direction away from portion 10b. In accordance with the invention, portions 10d and 10e together with portion 10c have a mean depth of not less than 50% of the height of the rib 11 in which they are formed.

Referring to FIGS. 5, 6, 7 and 12, there is shown another embodiment of the invention, in which circumferentially spaced slots 20 are formed in the surface of circumferentially extending rubber tread ribs 21. These slots 20 extend in from one edge of the rib 21 and continue to the other edge of the rib 21. Each slot is formed of interconnecting generally transversely extending portions 20a, 20b and 20c, and generally circumferentially extending portions 20d and 20e. These slots 20 are also formed in the ribs 21 during the molding of the tire.

FIG. 6 shows a development of one of the mold inserts 22 which form the slots 20 during the molding operation. The dash lines in FIG. 6 indicate the lines on which the insert is bent to form the insert shown in FIG. 7 which is used in the actual formation of the slots 20. The portions 22a, 22b and 22c of the insert 22 form the transversely extending portions 20a, 20b and 20c of the slot 20. Portions 22d and 22e form the generally circumferentially extending portions 20d and 20e of the slots 20.

In accordance with the invention, the generally transversely extending portions of the slots have a collective or mean depth of not greater than 35% of the height of the rib 21 as measured from the base of the anti-skid groove 23 to the outer surface of the rib 21. The generally circumferentially extending portions of the slots have a collective or mean depth of not less than 50% of the height of the rib 21 in which they are formed.

In this embodiment, the transversely extending portion 20a of the slot 20 (FIG. 12), which extends inwardly from the edge of the rib 21 and is formed by portion 22a of the insert 22, starts out being of substantially uniform depth and gradually increases in depth as it penetrates the rib 21. Portion 20d, which extends generally in a circumferential direction and is formed by portion 22d of the mold insert 22, gradually increases in depth from each end thereof towards the middle. Portion 20b, which extends in a transverse direction and is formed by portion 22b of the mold insert 22, decreases in depth from each end thereof towards the middle. Portion 20e, which extends generally in a circumferential direction and is formed by portion 22e of the mold insert 22, is similar in shape to portion 20d. Finally, portion 20c, which extends in a transverse direction and is formed by portion 22c of the mold insert 22, is similar to portion 20a.

Portions 20a, 20b and 20c have a mean depth not greater than 35% of the height of the rib 21 in which the slot is formed. Portions 20d and 20e, which extend in substantially circumferential directions and are formed by portions 22d and 22e of the insert 22, have a mean depth of not less than 50% of the height of the rib 21 in which they are formed.

Referring now to FIGS. 8, 9, 10 and 13, there is shown a third embodiment of the invention, in which circumferentially spaced slots 30 are formed in the surface of circumferentially extending rubber tread ribs 31 of a pneumatic tire. These slots 30 extend in from one edge of the rib 31 and continue diagonally to the other edge of the rib 31. Each slot 30 is formed of interconnecting generally transversely extending portions 30a and 30b, and generally circumferentially extending portions 30c, 30d and 30e. The slots 30 are formed in the ribs 31 during the molding of the tire.

FIG. 9 shows a development of one of the mold inserts 32 which form the slots 30 during the molding operation. The dash lines in FIG. 9 indicate the lines on which the insert is bent to form the insert shown in FIG. 10 which is used in the actual formation of the slots 30. The portions 32a and 32b of the insert 32 form the transversely extending portions 30a and 30b of the slot 30. Portions 32c, 32d and 32e form the generally circumferentially extending portions 30c, 30d and 30e of the slots 30.

In accordance with the invention, the generally transversely extending portions of the slots have a collective or mean depth of not greater than 35% of the height of the rib 31 as measured from the base of the anti-skid groove 33 to the outer surface of the rib 31. The generally circumferentially extending portions of the slots have a collective or mean depth of not less than 50% of the height of the rib 31 in which they are formed.

In this example, the transversely extending portions 30a and 30b of the slot 30 (FIG. 13), which extend inwardly from both edges of rib 31 and are formed by portions 32a and 32b of the insert 32, respectively, are of substantially uniform depth. Portion 30c, which extends generally in a circumferential direction and is formed by portion 32c of the mold insert 32, gradually increases in depth in the direction away from the portion 30a and has a mean depth greater than that of portion 30a. Circumferentially extending portion 30d of the slot 30, which is formed by portion 32d of the mold insert 32, is also of substantially uniform depth. Portion 30e, which extends generally in a circumferential direction and is formed by portion 32e of the mold insert 32, gradually decreases in depth in the direction away from the portion 30d and has a mean depth greater than that of portion 30b. Portions 30a and 30b have a mean depth of not greater than 35% of the height of the rib 31 in which they are formed. Portions 30c, 30d and 30e have a mean depth of not less than 50% of the height of the rib 31 in which they are formed.

We have thus invented a slotted tire tread in which the generally circumferentially extending portions of each slot have collectively a mean depth substantially greater than the mean depth of the generally transversely extending portions. Limiting the collective or mean depth of the generally transversely extending portions of the slots to 35% of the rib height minimizes loss of sections of the tread between the slots. Furthermore, proportioning the generally circumferentially extending portions of the slots to have collectively a mean depth of not less than 50% of the rib height provides a very substantial increase in tread flexibility and traction properties. Slots formed in tire treads according to this invention substantially improve the skid resistance of the tread and, at the same time, provide for a decrease in tread noise.

The term "rubber" is used herein in its generic sense to include natural rubber, synthetic rubber and blends thereof.

While three particular embodiments of the invention have been shown and described, it will be appreciated that this is for the purpose of illustration only and that modifications can be made without departing from the spirit and scope of the invention by adherence to the general arrangement and proportions described.

Having thus described our invention, what we claim and desire to protect by Letters Patent is:

1. In a tire having a rubber tread surface, a plurality of slots formed in the tread surface, each of said slots being formed of interconnected generally transversely extending portions and generally circumferentially extending portions, the generally circumferentially extending portions each having a mean depth greater than that of each of the generally transversely extending portions.

2. In a tire having ribbed rubber tread, a plurality of circumferentially unconnected slots formed in the surface of at least one of the tread ribs, each of said slots being formed of interconnected generally transversely extending portions and generally circumferentially extending portions, the generally transversely extending portions each having a depth less than that of each of the generally circumferentially extending portions.

3. In a tire having a ribbed rubber tread, a plurality of circumferentially unconnected spaced pairs of slots formed in the surface of at least one of the tread ribs, each of said slots being formed of interconnected generally transversely extending portions of variable depth and generally circumferentially extending portions of variable depth, the generally circumferentially extending portions each having a mean depth greater than that of each of the generally transversely extending portions, one slot of each pair of slots extending inwardly from one lateral edge of the rib and the other slot of each pair of slots extending inwardly from the other lateral edge of the rib, and the slots of each pair overlapping each other both transversely and circumferentially of the tread.

4. In a tire having a ribbed rubber tread, a plurality of circumferentially unconnected spaced pairs of slots formed in the surface of at least one of said tread ribs, each of said slots being formed of interconnected generally transversely extending portions and generally circumferentially extending portions, the generally circumferentially extending portions each having a mean depth greater than that of each of the generally transversely extending portions, one slot of each pair of slots extending inwardly from one lateral edge of the rib and the other slot of each pair of slots extending inwardly from the other lateral edge of the rib.

5. In a tire having a ribbed rubber tread, a plurality of circumferentially unconnected spaced slots formed in the surface of at least one of the tread ribs, each of said slots being formed of interconnected generally transversely extending portions of variable depth and generally circumferentially extending portions of variable depth, the generally circumferentially extending portions each having a mean depth greater than that of each of the generally transversely extending portions, each slot extending from one lateral edge of the rib to the other lateral edge of the rib.

6. In a tire having a ribbed rubber tread, a plurality of circumferentially unconnected spaced slots formed in the surface of at least one of said tread ribs, each of said slots being formed of interconnected generally transversely extending portions and generally circumferentially extending portions, the generally circumferentially extending portions each having a mean depth greater than that of each of the generally transversely extending portions, each slot extending from one lateral edge of the rib to the other lateral edge of the rib.

References Cited in the file of this patent

UNITED STATES PATENTS

| | | |
|---|---|---|
| D. 169,914 | Roberts | June 23, 1953 |
| 2,272,879 | Hargraves | Feb. 10, 1942 |
| 2,404,579 | Coben | July 23, 1946 |
| 2,612,928 | Buddenhagen | Oct. 7, 1952 |
| 2,690,202 | Walsh | Sept. 28, 1954 |
| 2,708,957 | Constantakis et al. | May 24, 1955 |
| 2,850,066 | Nellen | Sept. 2, 1958 |